United States Patent

[11] 3,581,600

| [72] | Inventor | John W. Holdeman |
| | | Auburn, Ind. |
| [21] | Appl. No. | 828,981 |
| [22] | Filed | May 29, 1969 |
| [45] | Patented | June 1, 1971 |
| [73] | Assignee | Borg-Warner Corporation |
| | | Chicago, Ill. |

[54] TRANSMISSION MECHANISM
23 Claims, 6 Drawing Figs.

[52] U.S. Cl. .................................................. 74/665,
74/720.5, 74/764
[51] Int. Cl. ............................................. F16h 37/06,
F16h 57/10
[50] Field of Search .......................................... 74/754,
720.5, 764, 665; 192/4

[56] References Cited
UNITED STATES PATENTS

| 1,356,718 | 10/1920 | Holt | 74/720.5 |
| 1,447,837 | 3/1923 | DeNormanville | 74/754UX |
| 2,314,664 | 3/1943 | Shenstone | 74/695 |
| 2,861,663 | 11/1958 | Witzel | 192/4 |
| 3,133,455 | 5/1964 | White | 74/720.5 |
| 3,398,819 | 8/1968 | Ruhl et al. | 192/4 |

*Primary Examiner*—Arthur T. McKeon
*Attorneys*—Donald W. Banner, William S. McCurry and John W. Butcher ABSTRACT: A transmission having plural output paths including a single input shaft and a pair of planetary gear sets each adapted to drive an output member, means on said output member being shiftable to engage a forwardly or reversely rotating member of said planetary gear sets to provide a reduced speed drive in forward or a reduced speed drive in reverse by means of braking mechanisms for reaction elements of each gear set. The brake mechanism being arranged such that in forward or reverse operation one of the brake mechanisms will be connected to an element connected to the output member such that the particular brake mechanism can be actuated to serve as a vehicle brake for the wheels or track driven by that particular output member.

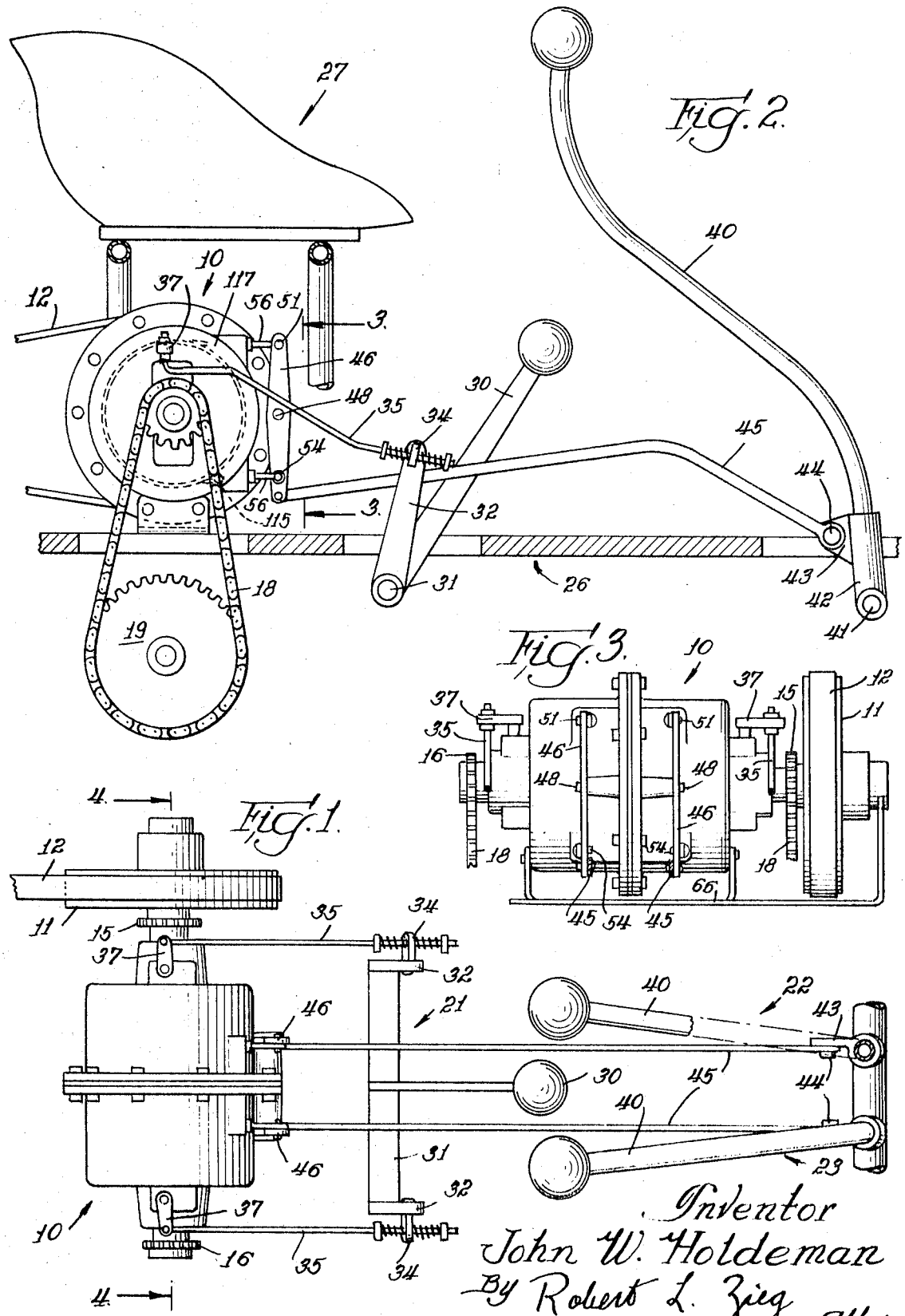

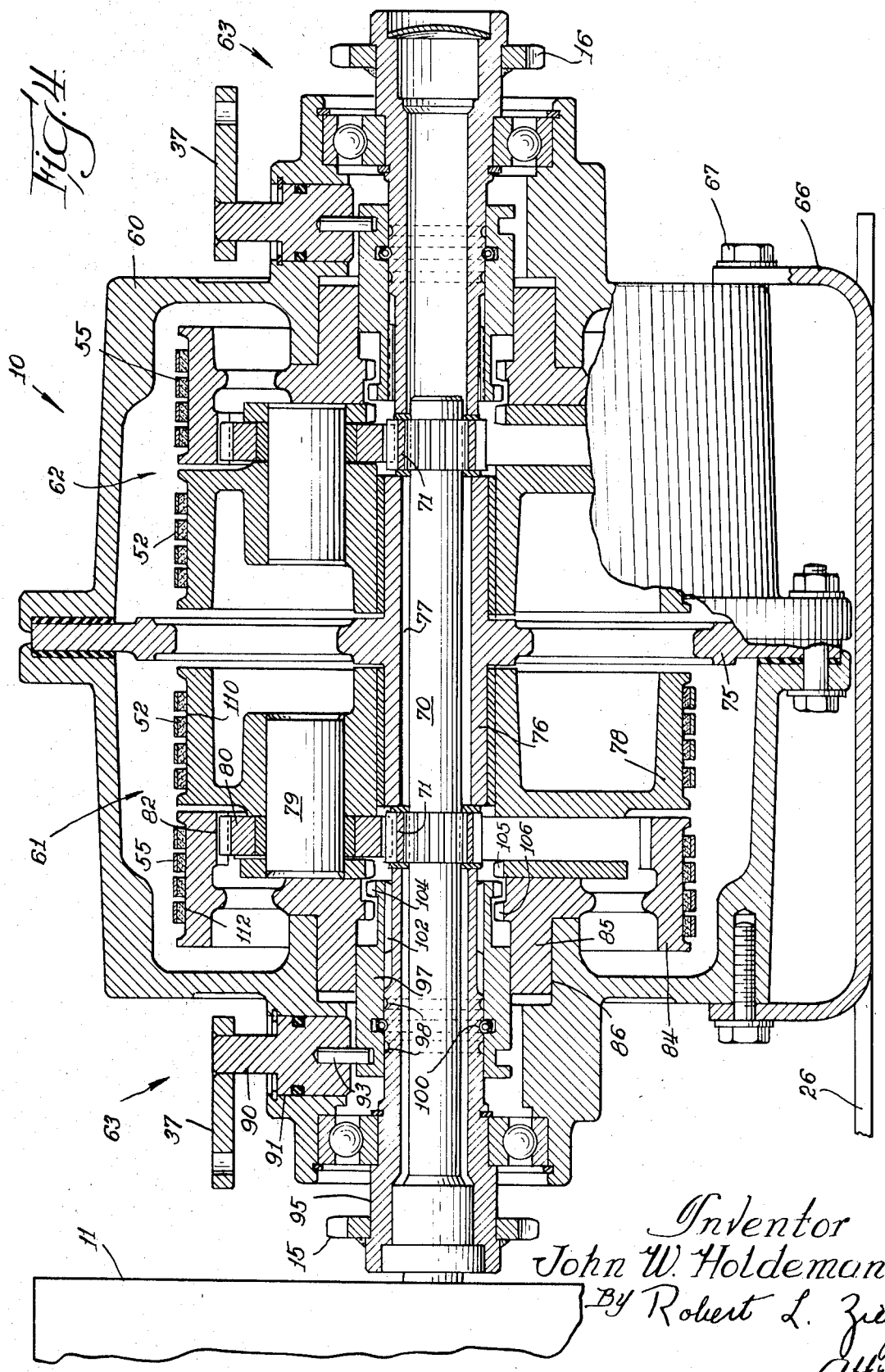

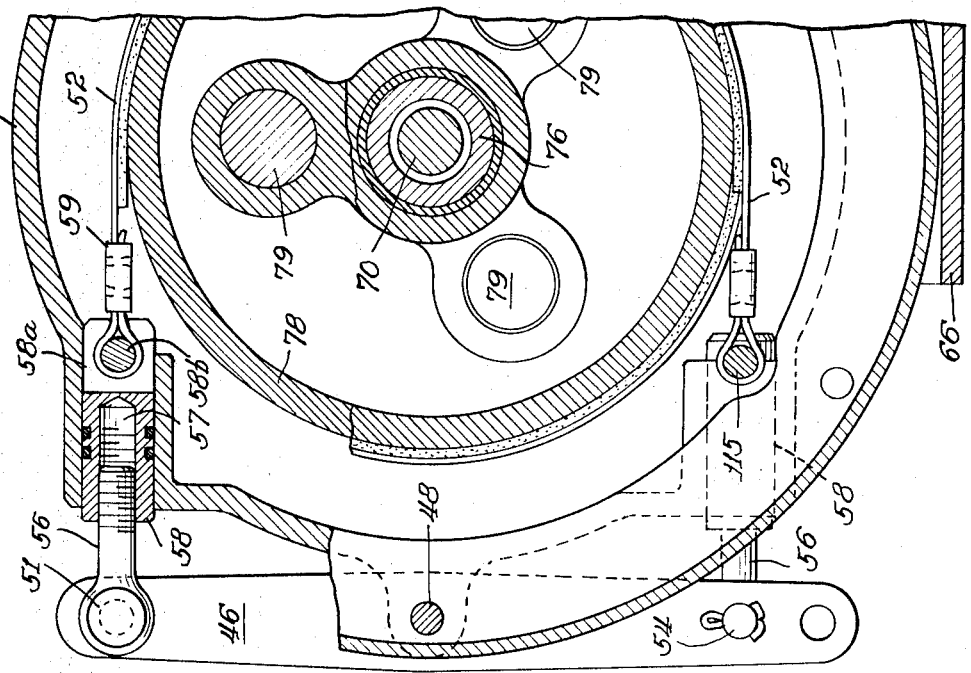
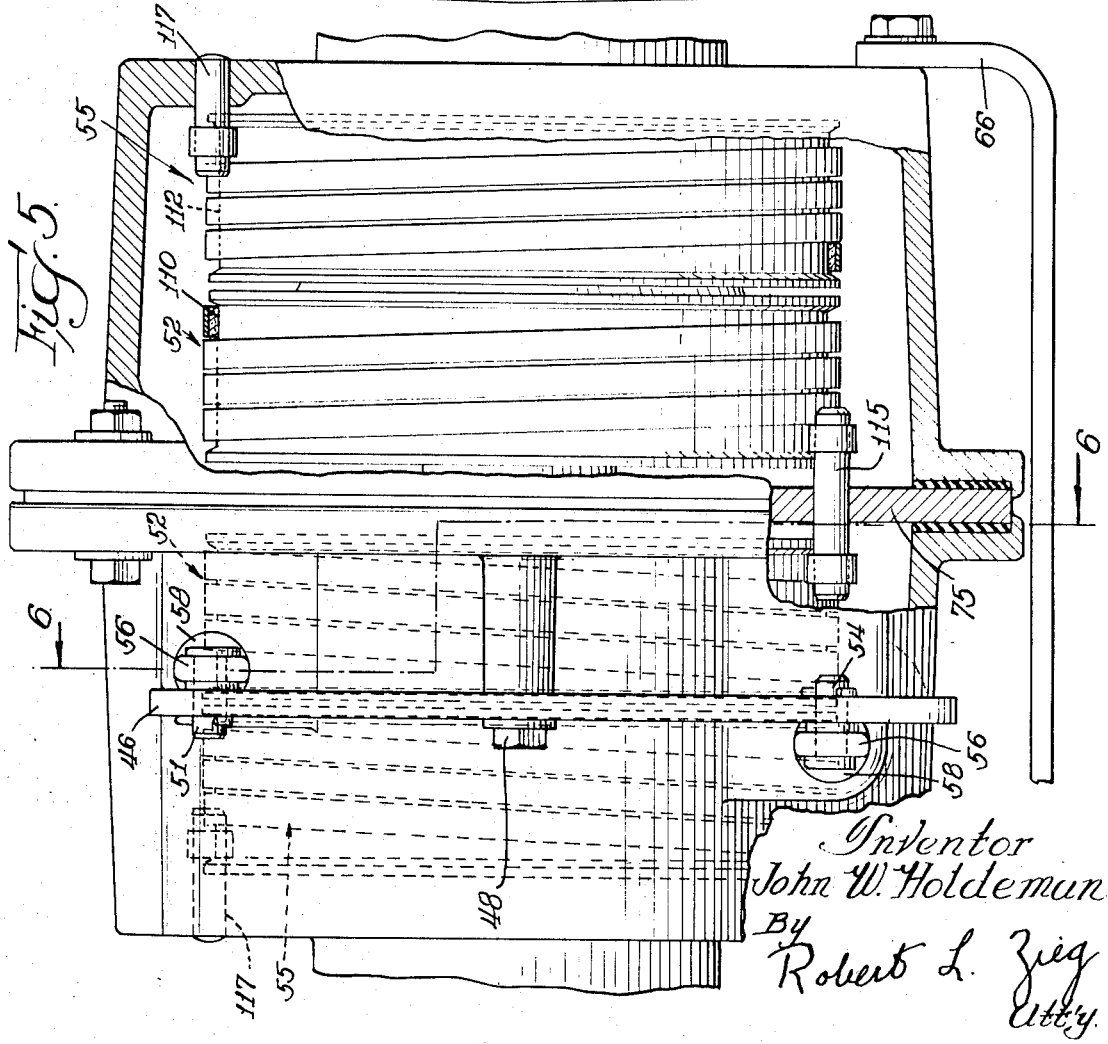

TRANSMISSION MECHANISM

SUMMARY OF INVENTION

In known types of gear trains for vehicles having tracks or wheels on either side thereof which may be driven at different speeds as for steering of the vehicle, transmissions are provided which usually are of the type having a 1:1 forward drive ratio and a reduced speed reverse drive. Further, in many known types of these devices separate wheel or track brakes are provided for vehicle braking.

The present transmission mechanism as described comprises a compact type of transmission having a single input and plural outputs adapted to be installed in a vehicle of the type where the wheels or tracks on either side thereof may be driven at the same or different speeds. The transmission of the present invention provides through means of two planetary gear sets, reduced speed drives forward as well as reduced speed drives in reverse through actuation of a clutch mechanism and corresponding actuation of a brake mechanism. Thus is provided in the planetary gear set the advantage of reduced speed drives which can be important to reduce the complexity of the drive line in small vehicles utilizing small engines. Since these vehicles normally require 10 to 15 to 1 ratio between transmission input and the vehicle wheels, additional components are required when using a transmission having only a 1:1 forward ratio. The transmission further provides for simple shifting between neutral and forward or reverse in each of the planetary gear sets for each of the output members. A single lever control may be provided which can be adapted to condition simultaneously each gear set for forward, neutral or reverse operation. A convenient mechanism is provided to shift the clutch mechanism to make the proper drive connections for forward, neutral or reverse. Also provided for the vehicle is a pair of lever mechanisms individually actuatable which are adapted to provide braking of reaction elements within the transmission so as to provide for driving of the output shaft and at the same time provide in an opposite direction of movement of the lever, vehicle braking by braking of the output member. The reaction element braking mechanism can be operated to provide partial engagement thereof permitting operation at various output speeds as required for maneuverability of the vehicle.

DESCRIPTION OF THE DRAWINGS

The invention consists of the novel constructions, arrangements and devices to be hereinafter described and claimed with reference to the accompanying drawings wherein:

FIG. 1 is a top view of a transmission mechanism in accordance with the present invention as adapted and installed in a vehicle;

FIG. 2 is a partial sectional view of a portion of a vehicle showing the installation of the transmission;

FIG. 3 is an end view taken along the direction of arrows 3-3 of FIG. 2;

FIG. 4 is a cross-sectional view through the transmission mechanism taken along the lines 4-4 of FIG. 1;

FIG. 5 is a view of the transmission with the housing partially broken away; and FIG. 6 is a view taken along line 6-6 of FIG. 5.

Referring to FIGS. 1 and 2, the present invention comprises a plural output path transmission mechanism 10 having an input pulley 11 adapted to be driven by a belt 12 from the engine of a vehicle. Output members or sprockets 15 and 16 are provided which are adapted to drive chains 18 which in turn drive sprocket wheels 19 which are connected to the wheels or tracks on either side of a vehicle (not illustrated).

In general, the control mechanism for the transmission comprises a directional selector mechanism 21 and friction element control mechanisms 22 and 23.

In FIG. 2 the transmission is shown as installed in a vehicle having a mounting base or platform 26 on which the transmission is secured, for example, by bolts. The selector and control mechanisms are secured and pivoted on the platform 26 as will be described. A vehicle seat 27 is schematically illustrated for the vehicle which overlies the transmission mechanism and may be secured in a known manner to the vehicle platform 26.

Selector mechanism 21 comprises a hand lever 30 which is adapted to rotate shaft 31 which is pivoted on the vehicle platform 26. Provided at the ends of shaft 31 and drivingly connected thereto are links 32 which are adapted to be moved through an arc in response to rotation of shaft 31 by direction control hand lever 30. By means of springs on either side of a driving lug 34 attached to links 32 a resilient driving connection is provided to rods 35. The rods 35 are adapted to move levers 37 pivoted on the transmission mechanism and thereby condition the planetary gear set provided on either side of the transmission mechanism 10 to provide forward, neutral, or reverse drive.

Friction element control mechanisms 22 and 23 are identical in construction and, therefore, only mechanisms 22 will be described, the same numbers applying to mechanism 23. Control mechanism 22 comprises a hand lever 40 pivoted on the vehicle platform 26 at 41. A sleeve 42 is provided at the end of the hand lever 40 surrounding hand lever 40 and having a flange 43 thereon which is pivotally connected at 44 to a rod 45. The rod 45 is connected to a link 46. The link 46 is pivoted on the transmission on a fixed pivot 48. A brake band mechanism is connected to either end of the link 46. Pivoted on a pin 51 on link 46 and drivingly connected thereto is the end of a brake band 52 and pivoted on a pin 54 on link 46 and drivingly connected thereto is a brake band 55. A threaded bolt 56 is connected to pins 51 and 54 and is received in a threaded socket 57 in a slidable block 58 which has a bifurcation 58a in one end thereof having a pin 58b mounted therein. The ends of brake bands 52 and 55 are looped around pins 58b. The end of brake bands 52 and 55 may be looped in any known manner and is carried out, for example, by a sheet metal clamp 59 as illustrated in the drawing. The operation of the brake mechanisms and actuation thereof by the friction element control mechanisms 22 and 23 will be described later in connection with the operation of the transmission mechanism of FIG. 4.

Referring to FIG. 4, the transmission of the present invention is illustrated and, in general, comprises a housing 60 having a pair of planetary gear sets 61 and 62 therein. A selecting mechanism 63 is provided for each of the gear sets 61 and 62. Since the planetary gear sets are identical in construction, planetary gear set 61 and its selecting mechanism 63 only will be described in detail, the planetary gear set 62 being identical. The planetary gear set 61 is adapted to drive output sprocket 15 and planetary gear set 62 drives output sprocket 16.

A mounting flange member 66 is provided which mounts the transmission housing 60 to the vehicle platform 26, as for example, by bolts 67. The pulley 11 which is driven by the belt 12 which in turn is driven by the engine of the vehicle, drives an input shaft 70 of the transmission. Shaft 70 drives the sun gears 71 for each of the planetary gear sets 61, 62. A central support 75 is provided which is bolted between the halves of the housing 60 to support a central bearing 76 which supports parts of gear sets 61 and 62 as will be described. A clearance 77 is provided between input shaft 70 and bearing 76 to allow flexibility of shaft 70. As will be apparent from FIG. 4, the central support can be replaced by a drive member such as a pulley or gear if it is desirable to have a central driving input to the planetary gear sets 61 and 62.

Rotatably mounted on the bearing 76 and supported thereby is a planetary carrier 78 having a plurality of shafts 79 therein each rotatably supporting a planetary pinion gear 80. The planetary carrier 78 has formed thereon a brake drum having a braking surface 110 thereon. A ring gear 82 is provided integral with a drum 84 which has a bearing portion 85 received within a bore 86 in the housing 60 so that the ring gear is rotatably journaled in the housing 60. Ring gear 82 meshes with planetary pinions 80.

Selecting mechanisms 63 for the planetary gear sets 61 and 62 comprise a cam or clutch operator 90 rotatably received in a bore 91 in housing 60. The cam 90 is drivingly connected to the levers 37 which are in turn driven by the selecting mechanism 21. Cam 90 has a pin 93 mounted eccentrically thereon. A hollow output shaft 95 is provided which has the sprockets, for example sprocket 15, drivingly connected thereto which in turn is connected to the wheels of the vehicle on one side thereof so that output shaft 95 is connected to the vehicle driving wheels or track. Shaft 95 is hollow and the input shaft 70 may extend therethrough. As can be seen from the drawing, output shafts 95 on either side of the vehicle are each hollow such that the driving pulley 11 and the input shaft 70 may be mounted from either side of the transmission mechanism, although, as illustrated in FIG. 4, the pulley 11 is mounted on the left side of the transmission. Slidably mounted on output shaft 95 is a drive sleeve 97. Grooves 98 are provided in the output shaft 95 which are adapted to receive a circular spring 100 such that the drive sleeve 97 will be held in any of three positions corresponding to grooves 98. The grooves 98 and spring 100 thus comprise a detent mechanism for drive sleeve 97. A spline connection 102 is provided between the drive sleeve 97 and output shaft 95.

Clutch teeth 104 are provided externally mounted on drive sleeve 97. Mating clutch teeth 105 are provided on the planetary carrier 78 of gear set 61. Mating clutch teeth 106 are provided on the drum 84 for ring gear 82. Drive sleeve 97 thus has a neutral position as illustrated in FIG. 4 in which clutch teeth 104 do not engage clutch teeth 105 or 106 and also has an engaged position meshing with clutch teeth 106.

Friction elements or brake bands 52 and 55 are formed in a spiral shape about the respective brake drums. The bands are made with a resilient action tending to unwrap them and thereby disengage the bands from the drum. Referring to FIGS. 5 and 6, it can be seen that counterclockwise movement of link 46 will pull block 58 and tighten brake band 52 about the drum 78, the band being anchored to a pin 115 mounted on central support 75. A pin 117 is provided in housing 60 which anchors and end of brake band 55. The bands are designed such that variable engaging force of the band with the drums may be applied by the operator so as to provide variable output braking or variable output speeds from the gear sets depending on the amount of force used by the operator.

OPERATION

When the operator wishes to move forward, the hand lever 30 is moved forward or clockwise as viewed in FIG. 2. Movement of hand lever 30 in this direction will position drive sleeves inwardly as viewed in FIG. 4, bringing clutch teeth 104 and 105 into engagement. The planetary carrier 78 is thus the output member of the gear set connected to drive the output sprocket 15 through drive sleeve 97. Likewise, in the gear set 62 the same connection is made. At this time the vehicle will be stationary since neither of the brake mechanism has been actuated and there is no reaction element for the gear sets. If the operator wishes to move forward the handles 40 of mechanisms 22 and 23 are moved forward simultaneously. In other words, clockwise as viewed in FIG. 2. As the handles 40 are moved forward, rods 45 will rotate links 46 counterclockwise and will pull on brake bands 55 to tighten bands 55 about the drums 84 and tend to hold the ring gears 82 stationary. With the ring gears 82 held stationary, and sun gears 71 driving, each of the gear sets will provide a reduced forward drive speed through the planetary carrier to the output sprockets. Depending upon the force applied to the levers, which establishes how much the drum may slip, various output speeds may be obtained as in starting. After full engagement of the brake bands output speeds are varied only by control of vehicle engine speed.

If the vehicle operator wishes to move in the reverse direction, the handle 30 is moved counterclockwise which will move the levers 37 to move the drive sleeves 97 to their reverse position in which clutch teeth 104 are engaged with clutch teeth 106 on the drum 84 of ring gear 82. The gear sets 61 and 62 are each then conditioned for reverse drive. However, the vehicle will be stationary since the brake bands 52 are not engaged. If the operator wishes to go in the reverse direction after moving handle 30 to its reverse position he pulls the handle 40 of friction element control mechanisms 22 and 23 toward him, or counterclockwise, as viewed in FIG. 2. This will keep brake bands 55 relaxed and tighten brake bands 52 to engage same with the surfaces 110 on planetary carriers 78. With the planetary carriers 78 held stationary and the sun gears 71 being driven by the input shaft 70, the ring gears 82 and thereby drums 84 and output shafts 95 will be driven in the reverse direction through the drive sleeve 97 at a reduced speed. Various output speeds in reverse can be obtained by varying the force of engagement of the bands 52 with the surfaces 110 as in starting.

The transmission of the present invention further provides an advantageous feature in that in either the forward or reverse drive conditions a vehicle braking function is provided. For example, when operating in the reverse direction as described above, the drive sleeves 97 are in a position drivingly connecting the drums 84 to the output shafts. Thus if brake bands 55 are engaged while operating in the reverse condition, the vehicle braking function is provided since the drum 84 is connected with the vehicle wheels or track. When operating in reverse, the operator has pulled the handles 40 counterclockwise to drive in reverse. If the operator now moves handles 40 to neutral position the vehicle is coasting and if handles 40 are then pushed forward the brake bands 52 will be relaxed interrupting the reverse drive and bands 55 will be engaged and will then act as vehicle wheel or track brakes to stop the vehicle. Likewise, when operating in the forward condition, the handles 40 are pushed to the forward position which is the clockwise position as viewed in FIG. 2. If handles 40 are moved to their extreme counterclockwise position brake band 55 will be released and band 52 engaged thereby braking the planetary carrier which will act as a vehicle brake since the planetary carrier is connected to the vehicle wheels or tracks.

Summarizing this unique feature, vehicle braking is obtained by merely moving the friction element control levers to their opposite direction from that which is used to make the vehicle go in the direction which has been selected by the direction selector handle 30. Thus, with the above-described unique transmission construction, the need for additional brakes has been eliminated since the brakes which are necessary to provide forward and reverse drive may be utilized to provide the vehicle braking function.

As adapted for the present invention, the brake bands 55 and 52 have an inherent resiliency tending to disengage them from their respective drum. This insures that when the speed control handles 40 are moved to their neutral positions the bands will be disengaged from the drums, as is required for operation of the vehicle.

The steering functions of the present transmission are illustrated by the following table:

| Type of Turn | Wheels or Track on One Side | Wheels or Track on Other Side |
| --- | --- | --- |
| Moderate | Drive | Neutral |
| Pivot | Drive | Brake |
| Spin | Forward Drive | Reverse Drive |

For making moderate turns, one of the handles 40 can be left in its neutral position and the other handle 40 moved to provide drive to one side of the vehicle only. Pivot turns are performed by moving one handle 40 to provide drive to one side of the vehicle and moving the other handle 40 to provide braking to the opposite side of the vehicle. Both moderate and pivot turns can be performed thusly with the transmission in either forward and reverse condition. Spin turns may be performed by conditioning one gearset for forward drive, the other gearset for reverse drive and engaging the corresponding friction elements to drive one side of the vehicle forward and the other side in reverse. In order to condition one gearset for forward and the other for reverse the selector mechanism 21 would have to be modified by doing away with the shaft 31 and actuating the rods 35 independently. This structure is not shown but is well within the scope of the present invention.

In accordance with the above description, it will be apparent that the present invention provides a novel and compact transmission arrangement wherein reduced drive ratios are provided both in a forward and reverse direction and the transmission inherently incorporates brake structures which may be used as brakes for the vehicle. Further, in the above transmission design a common single input shaft is used and plural output shafts are provided such that the vehicle may be steered by driving the wheels or tracks on one side of the vehicle with the other wheels or tracks on one side of the vehicle with the other wheels or tracks either nondriven, braked or driven in the opposite direction. The direction selector mechanism described contemplated the use of a special lever arrangement such that when forward or reverse direction is selected each of the planetary gear sets are shifted simultaneously into forward or reverse drive condition by a single lever 30 for simplicity or operation.

As above described, it will be apparent that the unique transmission mechanism is one which allows for easy operation by the driver of the vehicle since to make the vehicle move forward the handles 40 are moved forward and to make it go in reverse the handles 40 are moved back toward the driver and braking is provided by moving in the opposite direction which is a logical and natural arrangement for the operator.

Various features of the invention have been particularly shown and described; however, it should be obvious to one skilled in the art that modifications may be made therein without departing from the scope of the invention.

I claim:

1. In a transmission mechanism having a pair of output shafts and a single input shaft a planetary gear set for each of said output shafts connected between said input shaft and said output shafts, a plurality of friction engaging devices for each of said gear sets engageable to provide a plurality of drive trains between said input shaft and each of said output shafts, a selectively operable clutch device for each of said planetary gear sets having an engaging position completing each of said plurality of drive trains, and a clutch operator for each of said clutch devices and each journaled on said output shafts.

2. A transmission mechanism as claimed in claim 1 wherein said input shaft and said output shaft are coaxial.

3. A transmission mechanism as claimed in claim 1 wherein said output shafts are hollow and said input shaft is mounted within said output shafts.

4. A transmission mechanism as claimed in claim 1 wherein said friction engaging devices comprise multiwrap brake bands engageable with elements of said gear sets.

5. A transmission mechanism as claimed in claim 4 wherein said multiwrap bands are engaged by application of a tensional force and said bands having an inherent resiliency whereby when said tensional force is released said bands will disengage.

6. A transmission mechanism as claimed in claim 1 wherein each of said planetary gear sets includes a plurality of planetary gear elements have separately actuatable friction engaging devices for two of said planetary gear elements.

7. A transmission mechanism as claimed in claim 6 wherein one of said two friction engaging devices in engageable to provide a forward reduction drive train and the other friction engaging device is engageable to provide a reverse reduction drive train.

8. A transmission mechanism as claimed in claim 7 wherein a single lever is provided for each planetary gear set, said single levers being connected to each of said friction engaging devices whereby one of said levers can be actuated to engage either of said friction engaging devices for a particular planetary gear set.

9. A transmission mechanism as claimed in claim 8 wherein said friction engaging devices comprise miltiwrap bands engageable to hold stationary a gear element of said planetary gear sets.

10. A transmission as claimed in claim 9 wherein said gear element held stationary is connected to the output shaft for said particular planetary gear set.

11. In a transmission mechanism having a pair of output shafts and a single input shaft mounted in a housing, a planetary gear set for each of said output shafts connected between said input shaft and said output shafts, at least two brake devices for each of said gear sets individually engageable to provide a particular drive train between said input shaft and each of said output shafts, a selectively operable clutch device for each of said planetary gear sets having a position completing each of said drive trains, and a clutch operator for each of said clutch devices and each journaled in said housing.

12. A transmission mechanism as claimed in claim 11 wherein said input shaft and said output shaft are coaxial.

13. A transmission mechanism as claimed in claim 11 wherein said output shafts are hollow and said input shaft is mounted within said output shafts.

14. A transmission mechanism as claimed in claim 11 wherein said brake devices comprise multiwrap friction brake bands engageable with elements of said gear sets.

15. A transmission mechanism as claimed in claim 14 wherein one of said two brake devices is engageable to provide a reverse reduction drive train.

16. A transmission mechanism as claimed in claim 14 wherein a single lever is provided for each planetary gear set, said single levers being connected to each of said brake devices whereby one of said levers can be actuated to engage either of said friction engaging devices for a particular planetary gear set.

17. A transmission mechanism having a pair of output shafts and a single input shaft mounted in a housing, a planetary gear set for each of said output shafts connected between said input shaft and said output shafts, at least two brake devices for each each of said gear sets individually engageable to provide a plurality of drive trains between said input shaft and each of said output shafts, a selectively operable clutch device for each of said planetary gear sets having a position completing each of said drive trains, a clutch operator for each of said clutch devices and each journaled in said housing, and wherein one of said brake devices is engageable to provide a forward reduction drive train and the other brake device is engageable to provide a reverse reduction drive train.

18. A transmission mechanism as claimed in claim 17 wherein said brake devices comprise multiwrap brake bands engageable with elements of said gear sets.

19. A transmission mechanism as claimed in claim 18 wherein said multiwrap bands are engaged by application of a tensional force and said bands having an inherent resiliency whereby when said tensional force is released said bands will disengage.

20. In a transmission mechanism having a pair of output shafts and a single input shaft mounted in a housing, a planetary gear set for each of said output shafts connected between said input shaft and said output shafts, each of said planetary gear sets including a planetary pinion carrier element and a ring gear element, a brake device for each of said elements and engageable therewith to hold one of said elements stationary, one of said brake devices providing a forward drive through said planetary gear set when engaged, the other of said brake devices providing a reverse drive through said planetary gear set, a selectively operable clutch device for each of said planetary gear sets having a position completing each of said forward or reverse drive, and a clutch operator for each of said clutch devices and each journaled in said housing.

21. A transmission mechanism as claimed in claim 20 wherein said brake devices comprise multiwrap brake bands engageable with elements of said gear sets.

22. A transmission mechanism as claimed in claim 21 wherein said multiwrap bonds are engaged by application of a tensional force and said bands having an inherent resiliency whereby when said tensional force is released said bands will disengage.

23. A transmission mechanism as claimed in claim 20 wherein a single lever is provided for each planetary gear set, said single levers being connected to each of said brake devices whereby one of said levers can be actuated to engage either of said brake devices for a particular planetary gear set.